US009330894B1

(12) United States Patent
Kovtoun

(10) Patent No.: US 9,330,894 B1
(45) Date of Patent: May 3, 2016

(54) ION TRANSFER METHOD AND DEVICE

(71) Applicant: Thermo Finnigan LLC, San Jose, CA (US)

(72) Inventor: Viatcheslav V. Kovtoun, Santa Clara, CA (US)

(73) Assignee: Thermo Finnigan LLC, San Jose, CA (US)

( * ) Notice: Subject to any disclaimer, the term of this patent is extended or adjusted under 35 U.S.C. 154(b) by 0 days.

(21) Appl. No.: 14/613,168

(22) Filed: Feb. 3, 2015

(51) Int. Cl.
*H01J 49/06* (2006.01)
*G01N 27/62* (2006.01)
*H01J 49/02* (2006.01)
*H01J 49/00* (2006.01)

(52) U.S. Cl.
CPC ............. *H01J 49/06* (2013.01); *H01J 49/0045* (2013.01)

(58) Field of Classification Search
CPC ... H01J 49/063; H01J 49/062; H01J 49/4225; H01J 49/423; H01J 49/0031; H01J 49/427; H01J 49/066; H01J 49/4215; H01J 49/02; H01J 49/42; H01J 49/422; H01J 49/4235; H01J 49/4245; H01J 49/4255; H01J 49/4265; G01N 27/622; G01N 27/624
USPC ................. 250/292, 281, 282, 290, 287, 283, 250/396 R, 286, 288, 293, 289, 423 R, 424, 250/489, 505.1
See application file for complete search history.

(56) References Cited

U.S. PATENT DOCUMENTS

| | | | | |
|---|---|---|---|---|
| 4,721,854 | A * | 1/1988 | Dawson | H01J 49/4215 250/290 |
| 5,708,268 | A * | 1/1998 | Franzen | H01J 49/063 250/282 |
| 5,783,824 | A * | 7/1998 | Baba | H01J 49/423 250/281 |
| 6,417,511 | B1 * | 7/2002 | Russ, IV | H01J 49/063 250/292 |
| 6,693,276 | B2 | 2/2004 | Weiss et al. | |
| 6,794,641 | B2 * | 9/2004 | Bateman | H01J 49/062 250/281 |
| 6,800,846 | B2 * | 10/2004 | Bateman | H01J 49/062 250/281 |
| 6,812,453 | B2 * | 11/2004 | Bateman | H01J 49/062 250/281 |
| 7,071,467 | B2 * | 7/2006 | Bateman | H01J 49/4225 250/292 |
| 7,375,344 | B2 * | 5/2008 | Derrick | H01J 49/065 250/292 |
| 7,405,401 | B2 * | 7/2008 | Hoyes | H01J 49/427 250/281 |
| 7,425,699 | B2 * | 9/2008 | Makarov | G01N 27/62 250/281 |

(Continued)

OTHER PUBLICATIONS

Giles, et al.,"Applications of a travelling wave-based radio-frequency-only stacked ring ion guide", Rapid Comm. Mass Spectrom. (2004), 18, pp. 2401-2414.

*Primary Examiner* — David A Vanore
(74) *Attorney, Agent, or Firm* — David A. Schell

(57) ABSTRACT

An ion transport device can include a plurality of pole rod pairs arranged in parallel, and a controller. The controller can be configured to apply voltages in a repeating voltage pattern to the pole rod pairs thereby creating a plurality of potential wells capable of capturing ions, and move the repeating voltage pattern along the pole rod pairs to move captured ions along the ion transport device. The ion transport device can be incorporated into a mass spectrometer.

28 Claims, 7 Drawing Sheets

(56) References Cited

U.S. PATENT DOCUMENTS

| | | | | | |
|---|---|---|---|---|---|
| 7,495,212 | B2 * | 2/2009 | Kim | H01J 49/066 | 250/292 |
| 7,498,571 | B2 * | 3/2009 | Makarov | H01J 49/022 | 250/281 |
| 7,718,959 | B2 * | 5/2010 | Franzen | H01J 49/4225 | 250/281 |
| 7,872,228 | B1 * | 1/2011 | Kim | H01J 49/423 | 250/287 |
| 7,952,070 | B2 * | 5/2011 | Senko | H01J 49/063 | 250/281 |
| 8,013,290 | B2 * | 9/2011 | Rather | H01J 49/004 | 250/281 |
| 8,049,169 | B2 * | 11/2011 | Satake | H01J 49/065 | 250/288 |
| 8,581,177 | B2 * | 11/2013 | Kovtoun | H01J 49/004 | 250/281 |
| 8,581,182 | B2 * | 11/2013 | Giles | H01J 49/26 | 250/282 |
| 8,629,409 | B2 | 1/2014 | Kovtoun | | |
| 8,637,815 | B2 * | 1/2014 | Makarov | H01J 49/406 | 250/281 |
| 8,829,434 | B2 * | 9/2014 | Yasuda | H01J 49/0045 | 250/281 |
| 8,957,368 | B2 * | 2/2015 | Kenny | H01J 49/422 | 250/283 |
| 8,969,799 | B2 * | 3/2015 | Green | H01J 49/065 | 250/282 |
| 9,070,540 | B2 * | 6/2015 | Brown | H01J 49/065 | |
| 9,111,654 | B2 * | 8/2015 | Giles | H01J 49/427 | |
| 9,117,646 | B2 * | 8/2015 | Schwartz | H01J 49/4215 | |
| 2005/0258362 | A1 * | 11/2005 | Collings | H01J 49/4225 | 250/290 |
| 2005/0269517 | A1 * | 12/2005 | Weiss | H01J 49/022 | 250/396 R |
| 2006/0038121 | A1 * | 2/2006 | Guevremont | H01J 49/063 | 250/290 |
| 2009/0173880 | A1 * | 7/2009 | Bateman | H01J 49/065 | 250/292 |
| 2009/0302216 | A1 * | 12/2009 | Londry | H01J 49/421 | 250/283 |
| 2013/0075602 | A1 * | 3/2013 | Stoermer | H01J 49/0045 | 250/283 |
| 2014/0048702 | A1 * | 2/2014 | Green | H01J 49/062 | 250/282 |
| 2015/0034814 | A1 * | 2/2015 | Brown | H01J 49/164 | 250/282 |
| 2015/0179421 | A1 * | 6/2015 | Jarrell | H01J 49/405 | 250/505.1 |

* cited by examiner

ION TRANSFER METHOD AND DEVICE

FIELD

The present disclosure generally relates to the field of mass spectrometry including systems and methods for transferring ions.

INTRODUCTION

Tandem mass spectrometry, referred to as MS/MS, is a popular and widely-used analytical technique whereby precursor ions derived from a sample are subjected to fragmentation under controlled conditions to produce product ions. The product ion spectra contain information that is useful for structural elucidation and for identification of sample components with high specificity. In a typical MS/MS experiment, a relatively small number of precursor ion species are selected for fragmentation, for example those ion species of greatest abundances or those having mass-to-charge ratios (m/z's) matching values in an inclusion list. There is growing interest in the use of "all-mass" MS/MS, in which all or a substantial subset of the precursor ions are fragmented. All-mass MS/MS yields information-rich spectra and removes the need to select and isolate particular ion species prior to mass analysis. In order to simplify the interpretation of product ion spectra produced by all-mass MS/MS, the analysis is conducted as a series of fragmentation/spectral acquisition cycles performed on different subsets or groups of the precursor ions, with each subset or group representing a different range of precursor ion m/z's. For example, if the precursor ions have m/z's ranging from 200 to 2000 Th, the first fragmentation/spectral acquisition cycle may be performed on a first group of ions having m/z's between 200 and 210 Th, the second fragmentation/acquisition cycle may be performed on a second group of ions having m/z's between 210 and 220 Th, and so on. U.S. Pat. No. 7,157,698 to Makarov et al., the disclosure of which is incorporated by reference, teaches a mass spectrometer architecture for implementing all-mass MS/MS with separation of the precursor ions into groups according to their m/z's. In the Makarov apparatus, an orthogonal-ejection two-dimensional ion trap is employed to eject m/z-grouped precursor ions into a collision cell, where the ions undergo fragmentation. The resultant product ions are transported to the entrance of a time-of-flight (TOF) mass analyzer for acquisition of a mass spectrum. TOF mass analyzers are particularly well-suited to all-mass MS/MS experiments due to their wide mass ranges and relatively short analysis times.

In TOF and other mass analyzers, large variations in the initial kinetic energies of the ions may significantly compromise measurement performance, particularly with respect to resolution and mass accuracy. As such, it is important to reduce the kinetic energy spread of the ejected ions, and product ions derived therefrom, prior to delivering the ions to the entrance of the mass analyzer. Cooling of the ions to reduce kinetic energy and kinetic energy spread may be accomplished by directing the ions through a cooling region in which the ions lose energy via collisions with neutral gas molecules. The cooling time may be substantially greater than the times required for ejection of an ion group from the trap (as well as for mass analysis of an ion group), which means that the ejection of a subsequent ion group from the trap into the fragmentation/cooling region must be delayed until cooling of the first ion group is completed. Differently expressed, the cooling period limits the rate at which the all-ion MS/MS analysis may be conducted and reduces the total number of analyses that may be performed during a chromatographic elution peak. Of course, the rate may be increased by employing a shorter cooling period, but doing so has a deleterious effect on resolution and/or mass accuracy.

U.S. Pat. No. 6,693,276 discloses an ion transport device consisting of a series of apertured diaphragms subjected to alternating phases of an RF voltage and a multiphase low-frequency traveling field voltage. Ion packages are injected along the axis of the apertured diaphragms and propelled by the traveling field along the length of the ion transport device.

U.S. Pat. No. 6,794,641 discloses a traveling wave ion guide. Here again, ions are injected along the axis of the ion guide. The ion guide consists of a plurality of segments, with each segment maintained at a substantially similar DC potential. Ions of similar mass-to-charge ratios can be packaged together, and propelled by a transient DC voltage that is progressively applied to the electrodes.

U.S. Pat. No. 7,405,401 discloses an ion extraction device consisting of a plurality of parallel RF plates stacked along an axis of the extraction device. Ions injected along the axis of the extraction device can be trapped within an effective potential created by the RF plates, allowing for the selective ejection of ions of a predetermined mass-to-charge ratio or ion mobility.

U.S. Pat. No. 6,812,453 discloses another embodiment of an ion guide in which ions are injected along the axis of the ion guide. A travelling DC wave is passed along the various segments of the device to uniformly accelerate ions so that all ions are ejected from the ion guide at a similar velocity, equal to the velocity of the traveling wave.

U.S. Pat. No. 7,718,959 discloses an ion storage bank including several storage cells configured as RF multipole rod systems. Ions are contained within each storage cell by the pseudopotential created by the pole rods, and can be shifted from one pseudopotential well to the next by applying a DC or AC pulse. Every two adjacent cells share a pair of pole rods.

In traveling wave devices, ions "surf" on the top of the moving DC gradient wave. The moving DC gradient wave provides no constraint on how far ahead of the DC gradient wave ions can move and can cause spreading of the ion packets based on m/z ratio or ion mobility. As the process relies on accelerating the ions to the velocity of the traveling wave, and acceleration is affected by the mass of the ion, the speed of the wave may need to be adjusted for ions coming out at different steps of separation.

Decoupling the collision cell, the cooling, and the mass analysis from one another while keeping the product ions of one fragmentation cycle together, but separate from product ions from other fragmentation cycles, can improve the throughput of the analysis. From the foregoing it will be appreciated that a need exists for improved systems and methods for transferring ion packets containing a variety of mass-to-charge ratios, such as from the collision area to the detector.

SUMMARY

In a first aspect, an ion transport device of a mass spectrometer can include a plurality of pole rod pairs arranged in parallel and a controller. The pole rod pairs can define a plurality of ion transport cells, and each ion transport cell uniquely corresponding to a contiguous group of a fixed number of pole rod pairs, such that no two ion transport cells share a common pole rod pair. The controller can be configured to apply voltages in a repeating voltage pattern to the pole rod pairs thereby creating a plurality of potential wells capable of capturing ions. Each ion transport cell can receive the same pattern of voltages. The controller can be further configured to move the repeating voltage pattern along the pole rod pairs to move captured ions within and between the plurality of ion transport cells along the ion transport device; and apply at least one ejection voltage to one or more electrodes to cause ions to be ejected from the ion transport device in a direction parallel to the pole rods.

In various embodiments of the first aspect, captured ions in a potential well can include ions of differing mass-to-charge (m/z) ratio and the captured ions can be transported along the ion transport device concurrently.

In various embodiments of the first aspect, the ions can be transported along the ion transport device in a direction perpendicular to the pole rods.

In various embodiments of the first aspect, the ions can be injected into the ion transport device in a direction parallel to the pole rods.

In various embodiments of the first aspect, the ions can be ejected from the ion transport device in a direction parallel to the pole rods.

In various embodiments of the first aspect, the pole rods can be divided into plurality of segments.

In various embodiments of the first aspect, the ions are ejected from the ion transport device using a DC potential gradient.

In various embodiments of the first aspect, each pole rod pair can include a pole rod having a RF+ polarity and a pole rod having an RF− pole rod polarity.

In various embodiments of the first aspect, adjacent pole rod pairs can have opposite RF pole rod polarities.

In various embodiments of the first aspect, the spacing between pole rods of a pole rod pair can be greater than the spacing between pole rod pairs. In exemplary embodiments, the spacing between pole rods of a pole rod pair can be between two and four times greater than the spacing between pole rod pairs. In exemplary embodiments, the spacing between pole rod pairs can be substantially equal along the length of the ion transport device.

In various embodiments of the first aspect, the spacing between pole rods of a pole rod pair can be reduced near the ion ejection point of ion transport device.

In various embodiments of the first aspect, the repeating voltage pattern can be a stepped voltage pattern. In various examples, the stepped voltage pattern can be a pattern of High-Low-High applied across three pole rod pairs, the stepped voltage pattern can be a pattern of High-Low-Low-High applied across four pole rod pairs, or the stepped voltage pattern can be a pattern of High-Low-Low-Low-High applied across five pole rod pairs. Various stepped voltage patterns can be used to adjust to the width of the ion batch during injection into the moving latch. A wider ion beam may require the pattern with more Low states on the pole rods.

In various embodiments of the first aspect, the repeating voltage pattern can be a pattern of continuously varying voltage levels. In a first example, the pattern of continuously varying voltage levels can be applied across three pole rod pairs and can be defined by $V1(t)=V*\cos(\omega*t-Pi/4)$, $V2(t)=-V*\cos(\omega*t-Pi/4)$, $V3(t)=V*\cos(\omega*t-Pi/4)$. In another example, the pattern of continuously varying voltage levels can be applied across four pole rod pairs and can be defined by $V1(t)=V*\cos(\omega*t-Pi/4)$, $V2(t)$, $V*\sin(\omega*t-Pi/4)$, $V3(t)=-V*\cos(\omega*t-Pi/4)$, $V4(t)=-V*\sin(\omega*t-Pi/4)$. In yet another example, the pattern of continuously varying voltage levels can be applied across five pole rod pairs and can be defined by $V1(t)=V*\cos(\omega*t-Pi/5)$, $V2(t)=-V*\cos(\omega*t+(2/5)*Pi)$, $V3(t)=-V*\cos(\omega*t)$, $V4(t)=-V*\cos(\omega*t-(2/5)*Pi)$, $V5(t)=V*\cos(\omega*t+Pi/5)$.

In a second aspect, a mass spectrometer can include an ion source, an ion transport device including a plurality of pole rod pairs arranged in parallel, a fragmentation cell, one or more mass analyzers, and a controller. The pole rod pairs can define a plurality of ion transport cells, and each ion transport cell can uniquely correspond to a contiguous group of a fixed number of pole rod pairs, such that no two ion transport cells share a common pole rod pair. The fragmentation cell can supply ions to the ion transport device. The ion transport device can be positioned and oriented to receive ions from the fragmentation cell traveling in a direction parallel to the primary axes of the pole rods. The controller can be configured to apply voltages in a repeating voltage pattern to the pole rod pairs thereby creating a plurality of potential wells capable of capturing ions. Each ion transport cell can receive the same pattern of voltages. The controller can be further configured to move the repeating voltage pattern along the pole rod pairs to move captured ions within and between the plurality of ion transport cells along the ion transport device.

In various embodiments of the second aspect, captured ions in a potential well can include ions of differing mass-to-charge (m/z) ratio and the captured ions are transported along the ion transport device concurrently.

In various embodiments of the second aspect, the ions can be transported along the ion transport device in a direction perpendicular to the pole rods.

In various embodiments of the second aspect, the ions can be injected into the ion transport device in a direction parallel to the pole rods.

In various embodiments of the second aspect, the ions can be ejected from the ion transport device in a direction parallel to the pole rods.

In various embodiments of the second aspect, the pole rods can be divided into a plurality of segments. In various embodiments, a DC potential gradient can be applied across the segmented rods.

In various embodiments of the second aspect, each pole rod pair can include a pole rod having a RF+ polarity and a pole rod having an RF− pole rod polarity.

In various embodiments of the second aspect, adjacent pole rod pairs can have opposite RF pole rod polarities.

In various embodiments of the second aspect, the spacing between pole rods of a pole rod pair can be greater than the spacing between pole rod pairs. In exemplary embodiments, the spacing between pole rod pairs is substantially equal along the length of the ion transport device.

In various embodiments of the second aspect, the spacing between pole rods of a pole rod pair can be reduced near the ion ejection point of ion transport device.

In various embodiments of the second aspect, the RF voltage can be reduced near the ion ejection point of ion transport device.

In a third aspect, an ion transport device can include a plurality of ion transport cells arranged in parallel. The ion transport cells can include a contiguous group of a fixed number of pole rod pairs arranged in parallel, such that no two ion transport cells share a common pole rod pair. The plurality of ion transport cells can include a first and a second ion transport cell. A method of transporting ions along the ion transport device can include applying an initial voltage pattern to the pole rod pairs of the ion transport cells to create a plurality of potential wells within the ion transport cells. Each ion transport cell can receive the same pattern of voltages. The method can further include injecting a first plurality of ions into the first ion transport cell traveling in a direction parallel to the primary axes of the pole rods and capturing the first plurality of ions in the potential well of the first ion transport cell, altering the voltage pattern applied to the pole rods of the ion transport cells to move the potential well and the first plurality of ions to the second ion transport cell, and injecting a second plurality of ions into the first ion transport cell traveling in a direction parallel to the primary axes of the pole rods and capturing the second plurality of ions in the potential well of the first ion transport cell when a first cycle of the altering the voltage pattern is complete.

In various embodiments of the third aspect, the first plurality of ions can include ions of different mass to charge (m/z) ratio.

In various embodiments of the third aspect, the ions can be transported along the ion transport device in a direction perpendicular to the pole rods.

In various embodiments of the third aspect, the ions can be injected into the ion transport device in a direction parallel to the pole rods.

In various embodiments of the third aspect, the ions can be ejected from the ion transport device in a direction parallel to the pole rods.

In various embodiments of the third aspect, each pole rod pair can include a pole rod having a RF+ polarity and a pole rod having an RF− pole rod polarity.

In various embodiments of the third aspect, adjacent pole rod pairs can have opposite RF pole rod polarities.

DRAWINGS

For a more complete understanding of the principles disclosed herein, and the advantages thereof, reference is now made to the following descriptions taken in conjunction with the accompanying drawings, in which.

Figure 1:
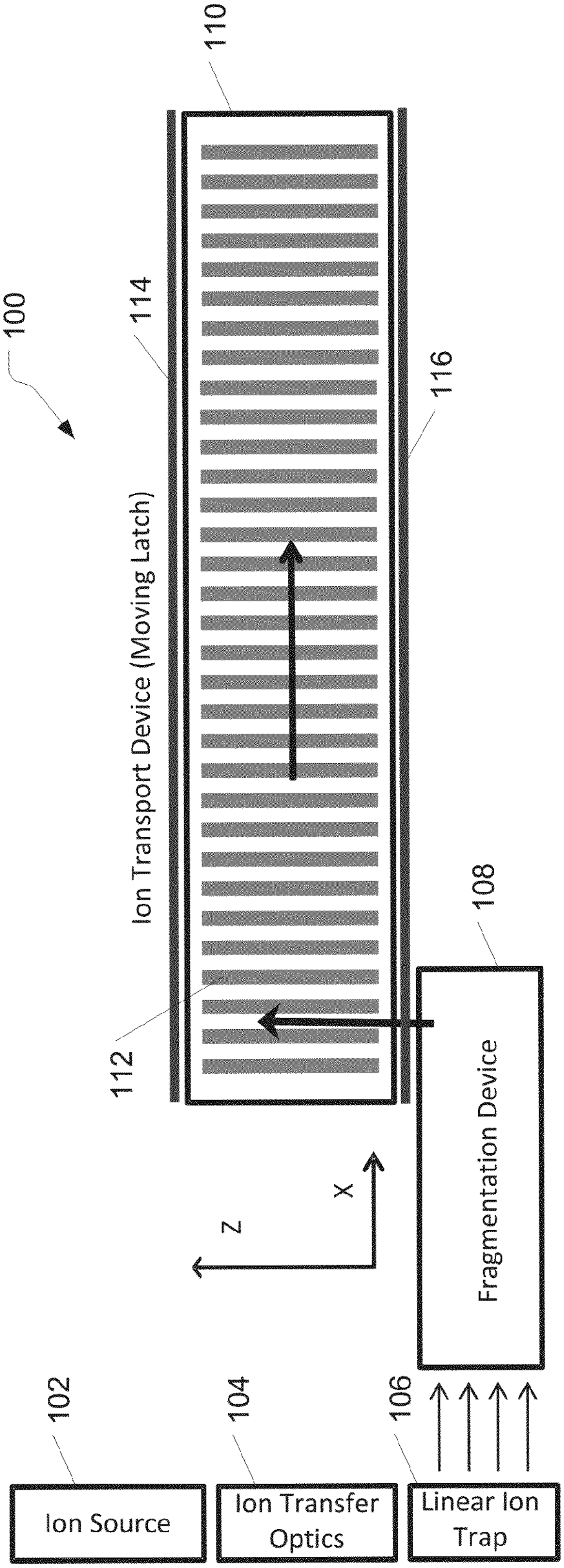
FIG. 1 is a block diagram illustrating an exemplary system for transporting ions, in accordance with various embodiments.

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DESCRIPTION OF VARIOUS EMBODIMENTS

Embodiments of systems and methods for transporting ions are described herein.

The section headings used herein are for organizational purposes only and are not to be construed as limiting the described subject matter in any way.

In this detailed description of the various embodiments, for purposes of explanation, numerous specific details are set forth to provide a thorough understanding of the embodiments disclosed. One skilled in the art will appreciate, however, that these various embodiments may be practiced with or without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the various embodiments disclosed herein.

All literature and similar materials cited in this application, including but not limited to, patents, patent applications, articles, books, treatises, and internet web pages are expressly incorporated by reference in their entirety for any purpose. Unless described otherwise, all technical and scientific terms used herein have a meaning as is commonly understood by one of ordinary skill in the art to which the various embodiments described herein belongs.

It will be appreciated that there is an implied "about" prior to the temperatures, concentrations, times, etc. discussed in the present teachings, such that slight and insubstantial deviations are within the scope of the present teachings. In this application, the use of the singular includes the plural unless specifically stated otherwise. Also, the use of "comprise", "comprises", "comprising", "contain", "contains", "containing", "include", "includes", and "including" are not intended to be limiting. It is to be understood that both the foregoing general description and the following detailed description are exemplary and explanatory only and are not restrictive of the present teachings.

As used herein, "a" or "an" also may refer to "at least one" or "one or more." Also, the use of "or" is inclusive, such that the phrase "A or B" is true when "A" is true, "B" is true, or both "A" and "B" are true. Further, unless otherwise required by context, singular terms shall include pluralities and plural terms shall include the singular.

A "system" sets forth a set of components, real or abstract, comprising a whole where each component interacts with or is related to at least one other component within the whole.

Ion Transport Device

FIG. 1 is a block diagram illustrating a system 100 for performing tandem mass spectrometry. The system 100 can include an ion source 102, ion optics 104, and a linear ion trap 106. The ion source 102 can include, but is not limited to, a matrix assisted laser desorption/ionization (MALDI) source, electrospray ionization (ESI) source, inductively coupled plasma (ICP) source, electron ionization source, photoionization source, glow discharge ionization source, thermospray ionization source, and the like. The ion optics 104 can guide the ions produced by the ion source 102 to the linear ion trap 106. In various embodiments, the ion trap 106 can capture the ions produced by the ion source 102 and release them based on their mass-to-charge (m/z) ratio. For example, the ion trap 106 can eject ions over a range of m/z as a function of time.

The system 100 can further include an ion fragmentation device 108 and a moving latch ion transport device 110. The ion fragmentation device can cause the precursor ions ejected from the ion trap 106 to fragment into smaller ions corresponding to portions of the precursor molecule. In various embodiments, the ion fragmentation device 106 can fragment ions by methods including, but is not limited to, Collision-induced dissociation (CID), Surface-Induced dissociation (SID), photodissociation, and the like. After the precursor ions are fragmented, the fragment ions can be transferred to the moving latch ion transport device 110.

The moving latch ion transport device 110 can include a plurality of pole rod pairs 112 arranged parallel to one another along a length (x-axis) of the moving latch ion transport device 110. In various embodiments, each pole rod pair 112 can consist of 2 pole rods separated in the direction orthogonal to the plane of the FIG. 1. Additionally, the moving latch may include guard electrodes 114 and 116.

In various embodiments, the moving latch ion transport device 110 can be considered to contain a plurality of ion transport cells, defined by a contiguous group of a fixed number of pole rod pairs. The ion transport cells can be arranged such that no two ion transport cells share a common pole rod pair. For example, an ion transport cell can consist of 3 pole rod pairs, 4 pole rod pairs, or even 5 or more pole rod pairs. A pattern of DC or AC voltages can be applied to the pole rod pairs of a cell, and the same pattern can be applied to each cell of the moving latch ion transport device. In various embodiments, the pattern can include a spatial sequence or progression of voltages applied to contiguous pole rod pairs that recurs along the length of the ion transport device, such that each ion transport cell receives the same pattern of voltages. The pattern can move along the moving latch ion transport device, such as by stepping the start of pattern along the plurality of pole rod pairs. For example, at $t_0$ the first voltage of the pattern may be applied to a rod pair $r_0$ and the rest of the pattern may be applied to the contiguous rods $r_1$ through $r_{n-1}$, and the pattern can start over again at $r_n$. At $t_1$, the first voltage of the pattern may be applied to $r_1$ and the rest of the pattern may be applied to contiguous rods $r_2$ through $r_n$, with the pattern starting over again at $r_{n-1}$, while the nth voltage can be applied to $r_0$. At $t_{n-1}$, the voltage pattern may start at $r_{n-1}$, whereas at $t_n$, the voltage pattern may start at $r_0$ again, with the first repeat of the starting at $r_n$. In particular embodiments, a potential well can be created by the pattern of voltages and ions trapped in the well can be passed from cell to cell along the length of the moving latch ion transport device as the changing pattern of voltages shifts the potential well along a cell and to the next cell.

In various embodiments, the fragment ions can be transferred from the fragmentation device 108 to the moving latch ion transport device 110 by injecting the fragment ions into the moving latch ion transport device 110 and parallel to the primary (longitudinal) axes of the pole rod pairs (in the z direction). The ions can then be sequentially transferred within and between the ion transport cells along the length of the moving latch ion transport device 110 (x direction, perpendicular to the primary axes of the pole rods) through manipulation of the electrical potentials of the pole rods. In various embodiments, the ions can be trapped within a potential well formed by the rods. As the potential well is moved along the moving latch ion transport device 110, fragment ions of various m/z ratios and ion mobilities can be kept together, rather than being dispersed along the length of the moving latch ion transport device 110 as would be the case if a potential wave was used to drive the ions.

In various embodiments, the moving latch ion transport device 110 can be filled with a damping or cooling gas. The damping gas can include He, $N_2$, Ar, air, or the like. In various embodiments, the gas can be at a pressure in a range of about 0.1 mtorr to about 100 mtorr, such as in a range of about 1 mtorr to about 30 mtorr.

A high potential can be placed on the guard electrodes 114 and 116 to confine the ions in the z dimension, until such time as the ions need to be removed from the moving latch ion transport device 110. In various embodiments, ions may be ejected from the moving latch ion transport device 110 by placing a high potential on guard electrode 116 and a low potential on guard electrode 114 and driving the ions out of the moving latch ion transport device 110 in the z direction (parallel to the length of the pole rods). Alternatively, ions may be ejected from the moving latch ion transport device 110 by using segmented rods with a gradient potential applied to drive the ions out of the moving latch ion transport device 110, as described in more detail below.

In various embodiments, the moving latch ion transport device 110 can transfer the ions to a mass analyzer or other structure that can feed the ions into the mass analyzer.

Figure 2:
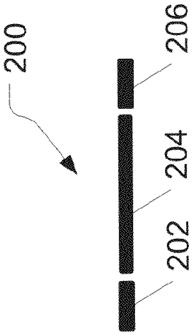
FIG. 2 is a diagram of an exemplary pole rod for use in a system for transporting ions, in accordance with various embodiments.

In various embodiments, the pole rods can be segmented, such as is shown in FIG. 2. Pole rod 200 can include segments 202, 204, and 206. In other embodiments, pole rods can include more or fewer segments. In various embodiments, placing a high potential on segments 202 and 206 while placing a low potential on segment 204 can trap the ions in a well along the z axis and centered at segment 204. Additionally, when ejecting the ions from the moving latch ion transport device 110, dropping the potential of segment 202 below the potential on segment 204 while keeping the potential of segment 206 high such that the potential on segment 204 is between the potentials on segment 202 and segment 206, can drive the ions out along the z axis in the direction of segment 202. In various embodiments, using segmented rods can eliminate the need for guard electrodes, such as guard electrodes 114 and 116 in FIG. 1.

Figure 3:
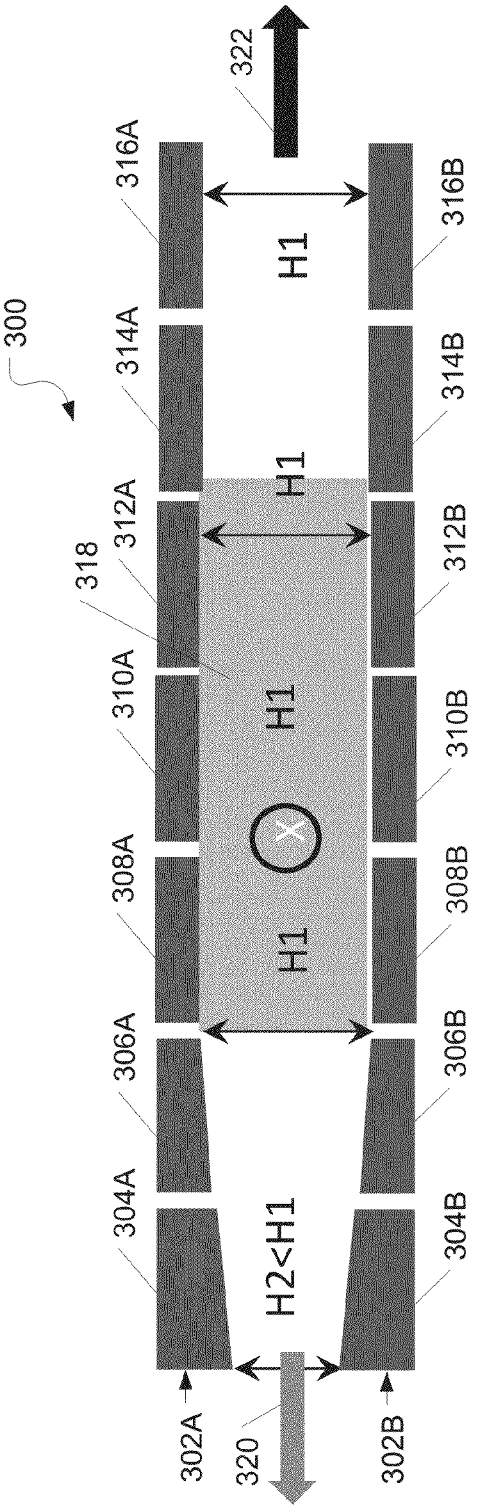
FIGS. 3 and 4 are diagrams showing segmented pole rod pairs, in accordance with various embodiments.

FIG. 3 shows a seven segment pole rod pair 300 with a restriction on one end. Pole rod pair 300 consists of two pole rods 302A and 302B. In various embodiments, pole rod pair 300 can be used in moving latch ion transport device 110 of FIG. 1, and pole rods 302A and 302B can be separated in the y direction of FIG. 1. Returning to FIG. 3, pole rod 302A can include segments 304A, 306A, 308A, 310A, 312A, 314A, and 316A and pole rod 302B can include segments 304B, 306B, 308B, 310B, 312B, 314B, and 316B. An intrarod distance (H1) between segments 308A and 308B can be constant across segment pairs 310A and 310B, 312A and 312B, 314A and 314B, and 316A and 316B. However, the intrarod distance can decrease along segments 306A and 306B and segments 304A and 304B to an intrarod distance (H2) such that $H2<H1$.

In various embodiments, ions can be confined with ion volume 318 by using higher potentials on segments 304A, 304B, 306A, 306B, 314A, 314B, 316A, and 316B, with lower potentials on segments 308A, 308B, 310A, 310B, 312A, and 312B. To eject ions from the ion volume, a gradient potential can be applied to the segments, such as applying a low potential on segments 304A and 304B, with increasing potentials applied in each segment pair as distance increases from segments 304A and 304B, with the highest potential applied to segments 316A and 316B. With the narrowing intrarod distance of segments, ions ejected along the direction 320 can be focused into a narrower ion volume. Alternatively, to eject ions along direction 322, a gradient potential can be applied with the lowest potential at segments 316A and 316B and the highest potential at segments 304A and 304B. Ion ejected along direction 322 may not be focused into a narrower ion volume as the intrarod distance between segments 316A and 316B is the same as for the central segments.

In various embodiments, the RF voltage applied to segments 304A, 304B, 306A, and 306B can be reduced relative to the RF voltage applied to 308A, 308B, 310A, 310B, 312A, 312B, 314A, 314B, 316A, and 316B. The closer proximity of the rod segments to the center increases the effect of the RF field generated by these rod segments. Thus, to maintain a uniform RF pseudopotential field effect on the ions, the RF voltage applied to the narrowing rod segments 304A, 304B, 306A, and 306B can be reduced along the length of rods 302A and 302B.

Figure 4:
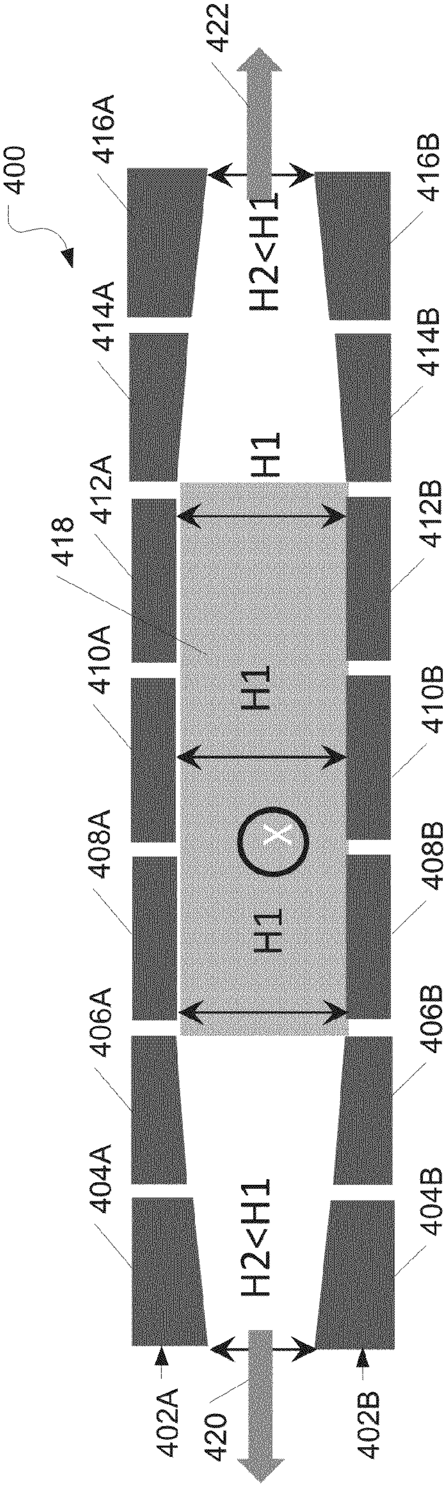

FIG. 4 shows a seven segment pole rod pair 400 with a restriction at both ends. Pole rod pair 400 consists of two pole rods 402A and 402B. In various embodiments, pole rod pair 400 can be used in moving latch ion transport device 110 of FIG. 1, and pole rods 402A and 402B can be separated in the y direction of FIG. 1. Returning to FIG. 4, pole rod 402A can include segments 404A, 406A, 408A, 410A, 412A, 414A, and 416A and pole rod 402B can include segments 404B, 406B, 408B, 410B, 412B, 414B, and 416B. An intrarod distance (H1) between segments 408A and 408B can be constant across segment pairs 410A and 410B, and 412A and 412B. However, the intrarod distance can decrease along segments 406A and 406B and segments 404A and 404B to an intrarod distance (H2) such that H2<H1. Similarly, the intrarod distance can decrease along segments 414A and 414B and segments 416A and 416B to intrarod distance H2 such that H2<H1.

In various embodiments, ions can be confined with ion volume 418 by using higher potentials on segments 404A, 404B, 406A, 406B, 414A, 414B, 416A, and 416B, with lower potentials on segments 408A, 408B, 410A, 410B, 412A, and 412B. To eject ions from the ion volume, a gradient potential can be applied to the segments, such as applying a low potential on segments 404A and 404B, with increasing potentials applied in each segment pair as distance increases from segments 404A and 404B, with the highest potential applied to segments 416A and 416B. With the narrowing intrarod distance of segments, ions ejected along the direction 420 can be focused into a narrower ion volume. Similarly, to eject ions along direction 422, a gradient potential can be applied with the lowest potential at segments 416A and 416B and the highest potential at segments 404A and 404B. Ion ejected along direction 422 can be focused into a narrower ion volume as the intrarod distance between segments 416A and 416B is smaller than the intrarod distance of the central segments.

In various embodiments, the RF voltage applied to segments 404A, 404B, 406A, 406B, 414A, 414B, 416A, and 416B can be reduced relative to the RF voltage applied to 408A, 408B, 410A, 410B, 412A, and 412B. As previously mentioned, the closer proximity of the rod segments to the center increases the effect of the RF field generated by these rod segments and the RF voltage applied to the narrowing rod segments 404A, 404B, 406A, 406B, 414A, 414B, 416A, and 416B can be sequentially reduced to generate a more uniform RF field along the pole rods axis to more closely match the RF field in segments 410A, 410B, 412A, and 412B.

Figure 5:
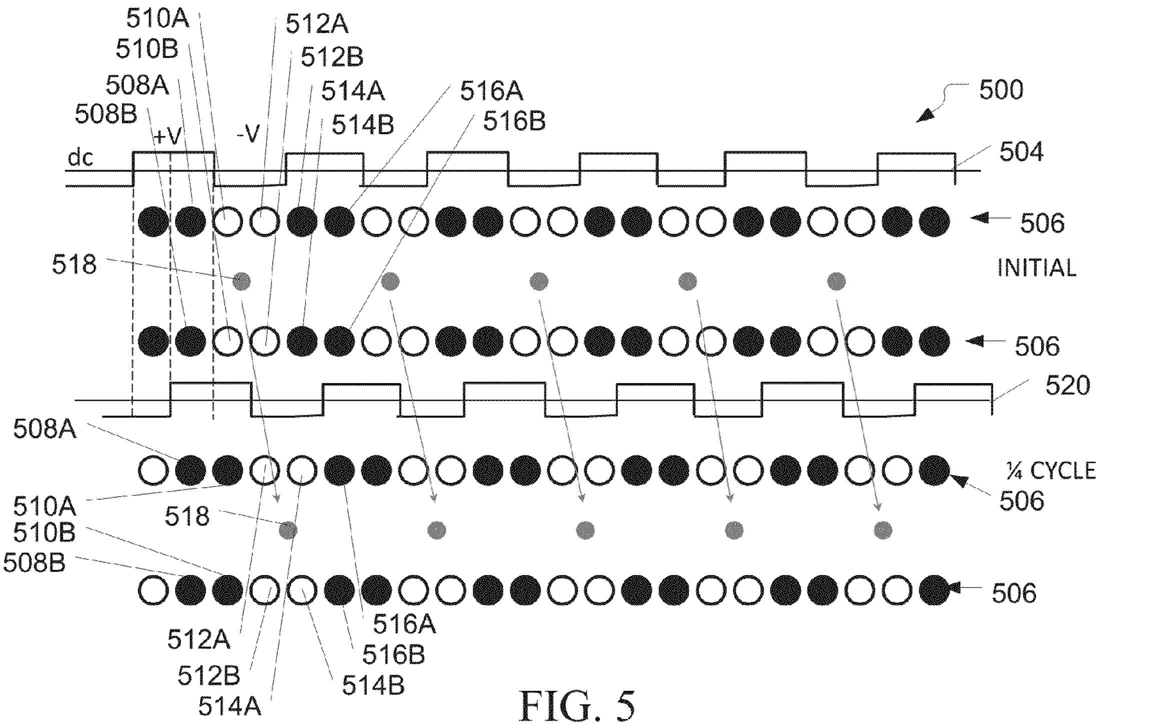
FIGS. 5 and 6 are diagrams showing stepped voltage patterns and the movement of ions through a system for transporting ions, in accordance with various embodiments.

FIG. 5 is a diagram showing a 4 rod stepped voltage pattern 500 and the migration of ions through a moving latch ion transport device, such as moving latch ion transport device 110. At an initial time, a voltage pattern 504 can be applied to the pole rods 506 of the moving latch ion transport device. In various embodiments and to illustrate the process, attention can be focused on a small set of rods, 508A, 508B, 510A, 510B, 512A, 512B, 514A, 514B, 516A, and 516B. A high potential (or alternatively a positive potential) can be applied to pole rods 508A, 508B, 514A, 514B, 516A, and 516B, while a low potential (or alternatively a negative potential) can be applied to pole rods 510A, 510B, 512A, and 512B. Pole rods 508A, 508B, 510A, 510B, 512A, 512B, 514A, and 514B can form an ion transport cell, and a second ion transport cell can begin at pole rods 516A and 516B. The applied potentials can generate a potential well centered between poles rods 510A, 510B, 512A, and 512B, trapping ion 518. In various embodiments, the potential pattern can be referred to as a High-Low-Low-High pattern, referencing the potentials applied to the four pole rod pairs that define the potential well.

At a time one quarter of the cycle after the initial time, the voltage pattern 520 can be shifted by one pole rod pair, such that the high (or positive) potential can be applied to pole rods 508A, 508B, 510A, 510B, 516A, and 516B and the low (or negative) potential can be applied to pole rods 512A, 512B, 514A, and 514B. With the change in the applied potentials, the potential well can shift to be located between pole rods 512A, 512B, 514A, and 514B and ion 518 can move to follow the potential well.

Figure 6:
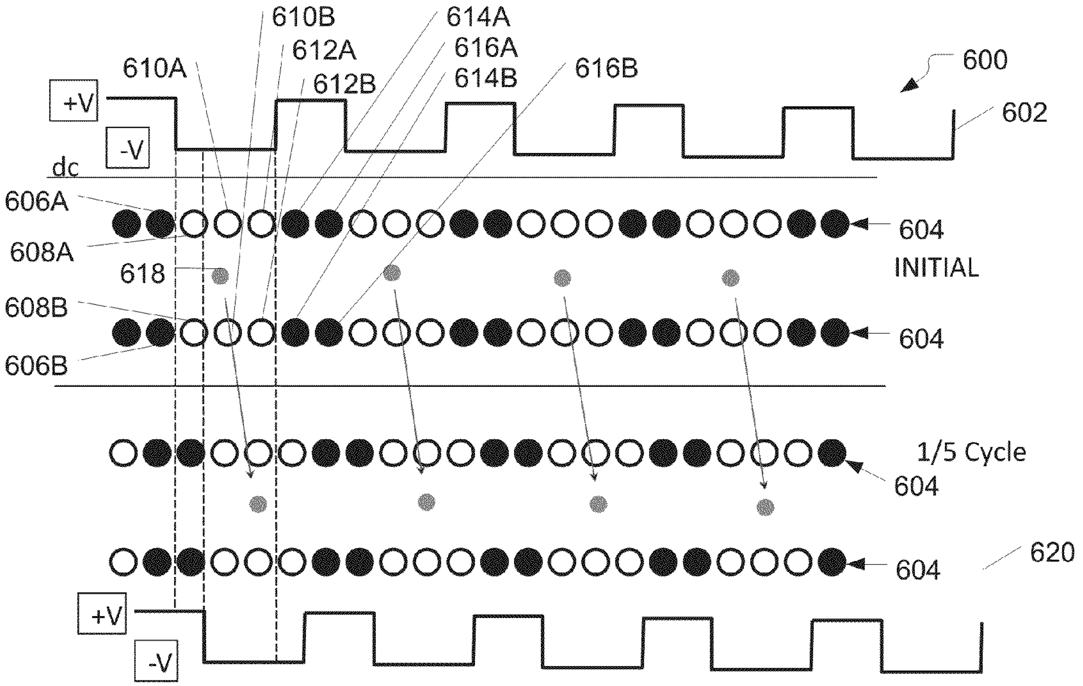

FIG. 6 is a diagram showing a 5 rod stepped voltage pattern 600 and the migration of ions through a moving latch ion transport device, such as moving latch ion transport device 110. At an initial time, a voltage pattern 602 can be applied to the pole rods 604 of the moving latch ion transport device. In various embodiments and to illustrate the process, attention can be focused on a small set of rods, 606A, 606B, 608A, 608B, 610A, 610B, 612A, 612B, 614A, 614B, 616A, and 616B. A high potential (or alternatively a positive potential) can be applied to pole rods 606A, 606B, 614A, 614B, 616A, and 616B, while a low potential (or alternatively a negative potential) can be applied to pole rods 608A, 608B, 610A, 610B, 612A, and 612B. The applied potentials can generate a potential well centered at poles rods around 610A and 610B, trapping ion 618. In various embodiments, the potential pattern can be referred to as a High-Low-Low-Low-High pattern, referencing the potentials applied to the five pole rod pairs that define the potential well.

At a time one fifth of the cycle after the initial time, the voltage pattern 620 can be shifted by one pole rod pair, such that the high (or positive) potential can be applied to pole rods 606A, 606B, 608A, 608B, 614A, 614B, 616A, and 616B and the low (or negative) potential can be applied to pole rods 610A, 610B, 612A, 612B, 614A, and 614B. With the change in the applied potentials, the potential well can shift to be centered at pole rods 612A and 612B and ion 618 can move to follow the potential well.

In various embodiments, other configurations, such as a 3 rod stepped voltage pattern of High-Low-High or stepped voltage patterns for more than 5 rods can be used. One of ordinary skill in the art would understand that various embodiments can be derived based on variations on the stepped rod pattern and number of rods and these embodiments are encompassed by this disclosure.

Figure 7:
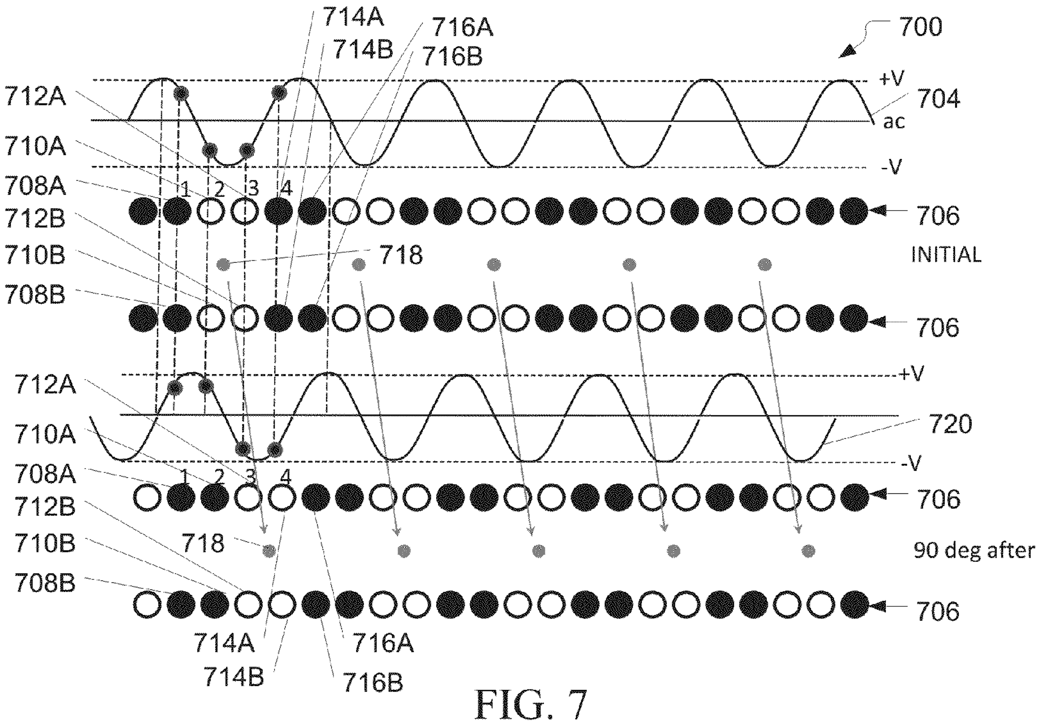
FIGS. 7 and 8 are diagrams showing a continuously varying voltage patterns and the movement of ions through a system for transporting ions, in accordance with various embodiments.

FIG. 7 is a diagram showing a 4 rod varying voltage pattern 700 and the migration of ions through a moving latch ion transport device, such as moving latch ion transport device 110. At an initial time, a sine wave voltage pattern 704 can be applied to the pole rods 706 of the moving latch ion transport device. In various embodiments and to illustrate the process, attention can be focused on a small set of rods, 708A, 708B, 710A, 710B, 712A, 712B, 714A, 714B, 716A, and 716B. The voltage applied to the first rod pair (708A and 708B) defined by $V1(t)=V*\cos(\omega*t-Pi/4)$. The voltage applied to the second rod pair (710A and 710B) can be defined by $V2(t)=V*\sin(\omega*t-Pi/4)$. The voltage applied to the third rod pair (712A and 712B) can be defined by $V3(t)=-V*\cos(\omega*t-Pi/4)$. The voltage applied to the forth rod pair (714A and 714B) can be defined by $V4(t)=-V*\sin(\omega*t-Pi/4)$. The voltage applied to 716A and 716B can be V1(t) as 716A and 716B comprise the first rod pair of the next group of 4 rod pairs.

At an initial time t=0, V1(t) and V4(t) are both positive and approximately 0.707*V, while V2(t) and V3(t) are both negative and approximately −0.707*V. A potential well can be formed between rods 710A, 710B, 712A, and 712B, trapping ion 718 between rods 710A, 710B, 712A, and 712B. At an intermediate time t=⅛ cycle or about 45 deg later (not shown), V1(t) can be approximately 1.0*V, V2(t) and V4(t) can be approximately 0, and V3(t) can be approximately −1.0*V. The potential well shifts to be centered at rod pair 712A and 7012B, moving ion 718 along. At a later time t=¼ cycle or about 90 deg later (sine wave 720), V1(t) and V2(t) can be about 0.707*V and V3(t) and V4(t) can be about −0.707*V. The potential well shifts further to be between rods 712A, 712B, 714A, and 714B, moving ion 718 along with the well to be located between rods 712A, 712B, 714A, and 714B.

Figure 8:
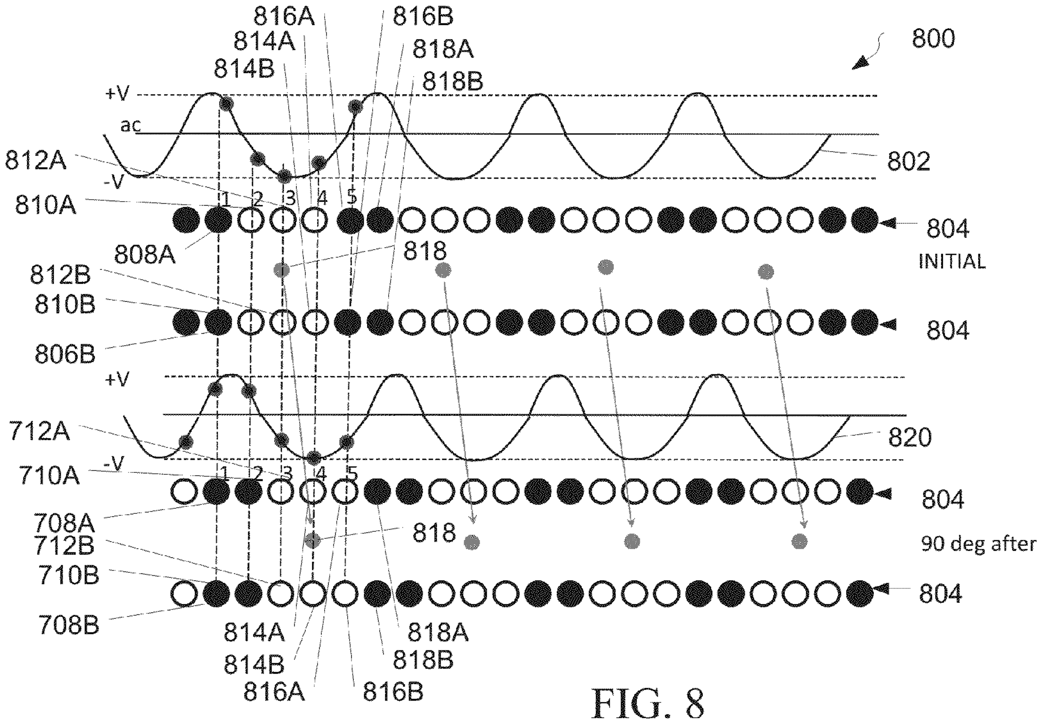

FIG. 8 is a diagram showing a 5 rod varying voltage pattern 800 and the migration of ions through a moving latch ion transport device, such as moving latch ion transport device 110. At an initial time, a sine wave voltage pattern 802 can be applied to the pole rods 804 of the moving latch ion transport device. In various embodiments and to illustrate the process, attention can be focused on a small set of rods, 806A, 806B, 808A, 808B, 810A, 810B, 812A, 812B, 814A, 814B, 816A, and 816B. The voltage applied to the first rod pair (806A and 806B) defined by V1(t)=V*cos(ω*t−Pi/5). The voltage applied to the second rod pair (808A and 808B) can be defined by V2(t)=−V*cos(ω*t+(⅖)*Pi). The voltage applied to the third rod pair (810A and 810B) can be defined by V3(t)=−V*cos(ω*t). The voltage applied to the forth rod pair (812A and 812B) can be defined by V4(t)=−V*cos(ω*t−(⅖)*Pi). The voltage applied to the fifth rod pair (814A and 814B) can be defined by V5(t)=V*cos(ω*t+Pi/5). The voltage applied to 816A and 816B can be V1(t) as 816A and 816B are the first rod pair of the next group of 5 rod pairs.

At an initial time t=0, V1(t) and V5(t) are both positive and approximately 0.8*V, V2(t) and V4(t) are both negative and approximately −0.3*V, and V3(t) is negative and approximately −1.0*V. A potential well can be formed centered between rods 810A and 810B, trapping ion 818 in the potential well. At an intermediate time t=1/10 cycle or about 36 deg later (not shown), V1(t) can be approximately 1.0*V, V2(t) and V5(t) can be approximately 0.3*V, and V3(t) and V4(t) can be approximately −0.8*V. The potential well shifts to be between rods 810A, 810B, 812A, and 812B, moving ion 818 along with the potential well to be located between rods 810A, 810B, 812A, and 812B. At a later time t=⅕ cycle or about 72 deg later (sine wave 820), V1(t) and V2(t) can be about 0.8*V, V3(t) and V5(t) can be about −0.3*V, and V4(t) can be about −1.0*V. The potential well shifts further to be centered between rods 812A and 812B, moving ion 818 along with the potential well to be centered between rods 812A and 812B.

In various embodiments, other configurations, such as a 3 rod varying voltage pattern or a varying voltage pattern for more than 5 rods can be used. An embodiment of the 3-rod varying voltage pattern can be defined by V1(t)=V*cos(ω*t−Pi/4), V2(t)=−V*cos(ω*t−Pi/4), V3(t)=V*cos(ω*t−Pi/4). One of ordinary skill in the art would understand that various embodiments can be derived based on variations on the varying voltage rod pattern and number of rods and these embodiments are encompassed by this disclosure.

Figure 9:
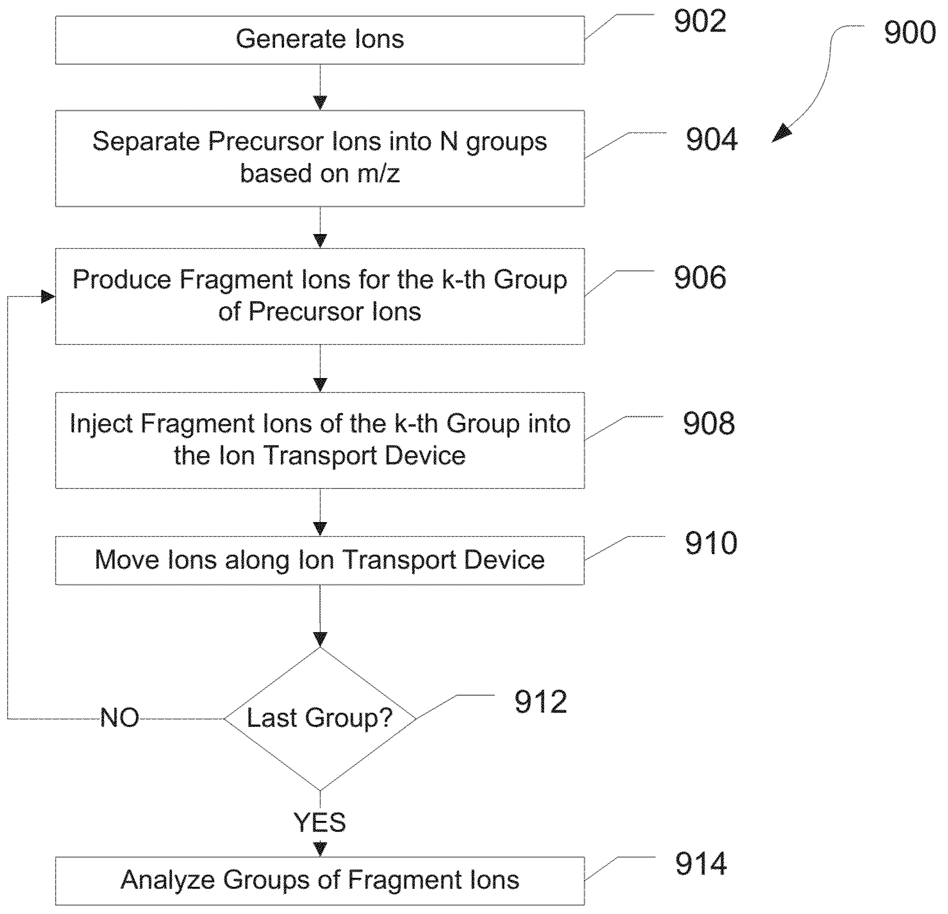
FIG. 9 is a flow diagram illustrating a method of analyzing the mass of ions in a mass analyzer incorporating a system for transporting ions, in accordance with various embodiments.

FIG. 9 is a flow diagram illustrating a processor for analyzing ions, in accordance with various embodiments. At 902, the ions can be generated. Depending on the sample, the ion may be generated in a variety of ways, including but not limited to, electrospray ionization (ESI), matrix assisted laser desorption/ionization (MALDI), inductively coupled plasma ionization, or various other ionization techniques. In various embodiments, the ions can be trapped and cooled, such as in an ion trap. At 904, precursor ions can be separated based on a mass-to-charge (m/z) ratio, such as by using a linear ion trap or the like. In various embodiments, the ions may be grouped into N groups based on their m/z ratio. At 906, the precursor ions can be fragmented to produce fragment ions. In various embodiments, precursor ions of a particular group having a particular m/z ratio or a range of m/z ratios can be fragmented together.

At 908, fragment ions can be injected into a first cell of an ion transport device. In various embodiments, the ions can be injected parallel to the pole rods and perpendicular to the direction of movement of the ions within the moving latch ion transport device. At 910, the fragment ions can be moved along the ion transport device. For example, the voltages can go through a complete cycle, moving the fragment ions from a first cell to a second cell of the moving latch ion transport device.

At 912, a determination can be made if the last group of ions have been fragmented and injected into the ion transport device. If there are additional precursor ions, they can be fragmented, as illustrated at 906. The cycle can continue for until each group of precursor ions is fragmented and injected into the ion transport device, that is, the cycle can repeat for each group k from 1 to N.

In various embodiments, precursor ions can be scanned out of a linear ion trap and small ranges of ions can be fragmented. The fragment ions from each range can be injected as a separate batch into the moving latch ion transport device. The moving latch ion transport device can keep each batch of fragment ions together while keeping them separated from other batches of fragment ions generated from precursor ions having a different range of m/z ratios.

In other embodiments, ions of a specific m/z range can be selected by a quadrupole mass filter and fragmented. The fragment ions can be injected into the moving latch ion transport device, and additional m/z ranges can be selected, fragmented, and injected into the moving latch ion transport device after the first group of ions is moved along to another cell.

When there are no additional precursor ions to be fragmented, groups of fragment ions in the moving latch ion transport device can be analyzed, as illustrated at 914. The moving latch ion transport device can operate to keep the groups of fragment ions separated from one another, while keeping fragment ions from each group together, regardless of m/z ratio or ion mobility. The group of fragment ions can be analyzed separately and related back to the m/z range of the precursor ions. In various embodiments, each group of fragment ions can be analyzed, or alternatively, select groups of fragment ions can be analyzed.

In various embodiments, the fragment ions can be ejected from the moving latch ion transport device in a direction parallel to the pole rods and perpendicular to the direction of movement of the ions within the ion transport device. The fragment ions can be ejected directly into a mass analyzer, or be ejected into an ion guide or ion transport device before advancing to the mass analyzer.

In various embodiments, after completing the ion transport and before ejection, continuously varying voltage pattern can be switched to static DC voltage pattern fixing momentary locations of ion pluralities in individual ion transport cells. In embodiments, ejection of ion pluralities from multiple ion transport cells can be arranged in parallel into corresponding storage cells on a cell-to-cell basis. Alternatively, ejection of ion pluralities can be arranged into a single storage cell in a consecutive way with or without switching of a repeating voltage pattern to the static DC voltage pattern.

Mass Spectrometry Platforms

Figure 10:
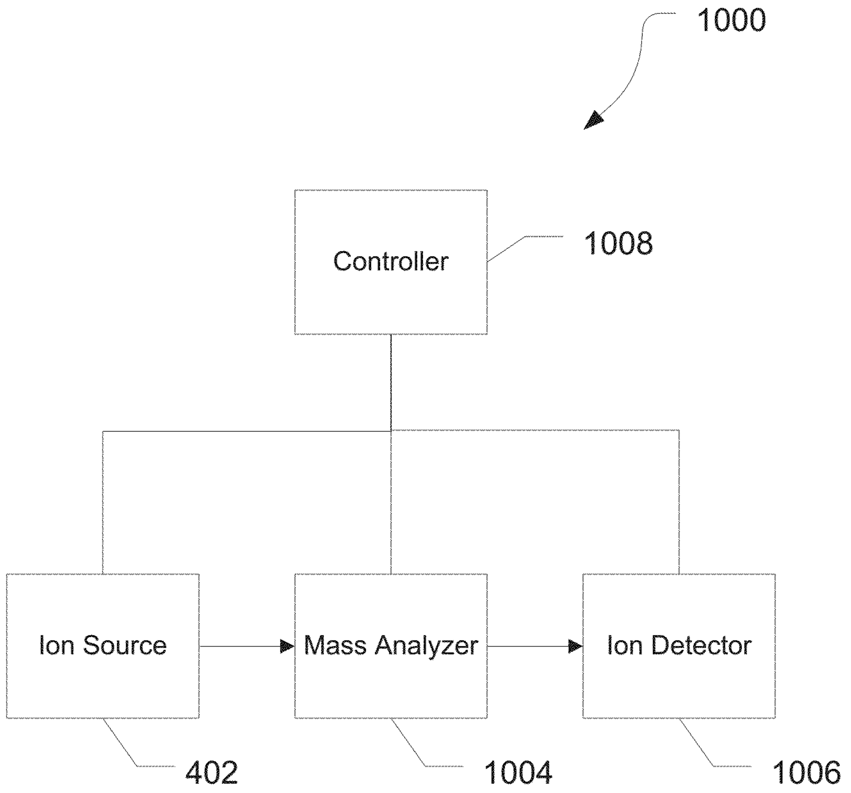
FIG. 10 is a block diagram illustrating an exemplary mass spectrometry platform, in accordance with various embodiments.

Various embodiments of mass spectrometry platform 1000 can include components as displayed in the block diagram of FIG. 10. In various embodiments, elements of FIG. 1 can be incorporated into mass spectrometry platform 1000. According to various embodiments, mass spectrometer 1000 can include an ion source 1002, a mass analyzer 1004, an ion detector 1006, and a controller 1008.

In various embodiments, the ion source 1002 generates a plurality of ions from a sample. The ion source can include, but is not limited to, a matrix assisted laser desorption/ionization (MALDI) source, electrospray ionization (ESI) source, inductively coupled plasma (ICP) source, electron ionization source, photoionization source, glow discharge ionization source, thermospray ionization source, and the like.

In various embodiments, the mass analyzer 1004 can separate ions based on a mass to charge ratio of the ions. For example, the mass analyzer 1004 can include a quadrupole mass filter analyzer, a time-of-flight (TOF) analyzer, a quadrupole ion trap analyzer, an electrostatic trap (e.g., Orbitrap) mass analyzer, and the like. In various embodiments, the mass analyzer 1004 can also be configured to fragment the ions and further separate the fragmented ions based on the mass-to-charge ratio.

In various embodiments, the ion detector 1006 can detect ions. For example, the ion detector 1006 can include an electron multiplier, a Faraday cup, and the like. Ions leaving the mass analyzer can be detected by the ion detector. In various embodiments, the ion detector can be quantitative, such that an accurate count of the ions can be determined.

In various embodiments, the controller 1008 can communicate with the ion source 1002, the mass analyzer 1004, and the ion detector 1006. For example, the controller 1008 can configure the ion source or enable/disable the ion source. Additionally, the controller 1008 can configured the mass analyzer 1004 to select a particular mass range to detect. Further, the controller 1008 can adjust the sensitivity of the ion detector 1006, such as by adjusting the gain. Additionally, the controller 1008 can adjust the polarity of the ion detector 1006 based on the polarity of the ions being detected. For example, the ion detector 1006 can be configured to detect positive ions or be configured to detected negative ions.

Computer-Implemented System

Figure 11:
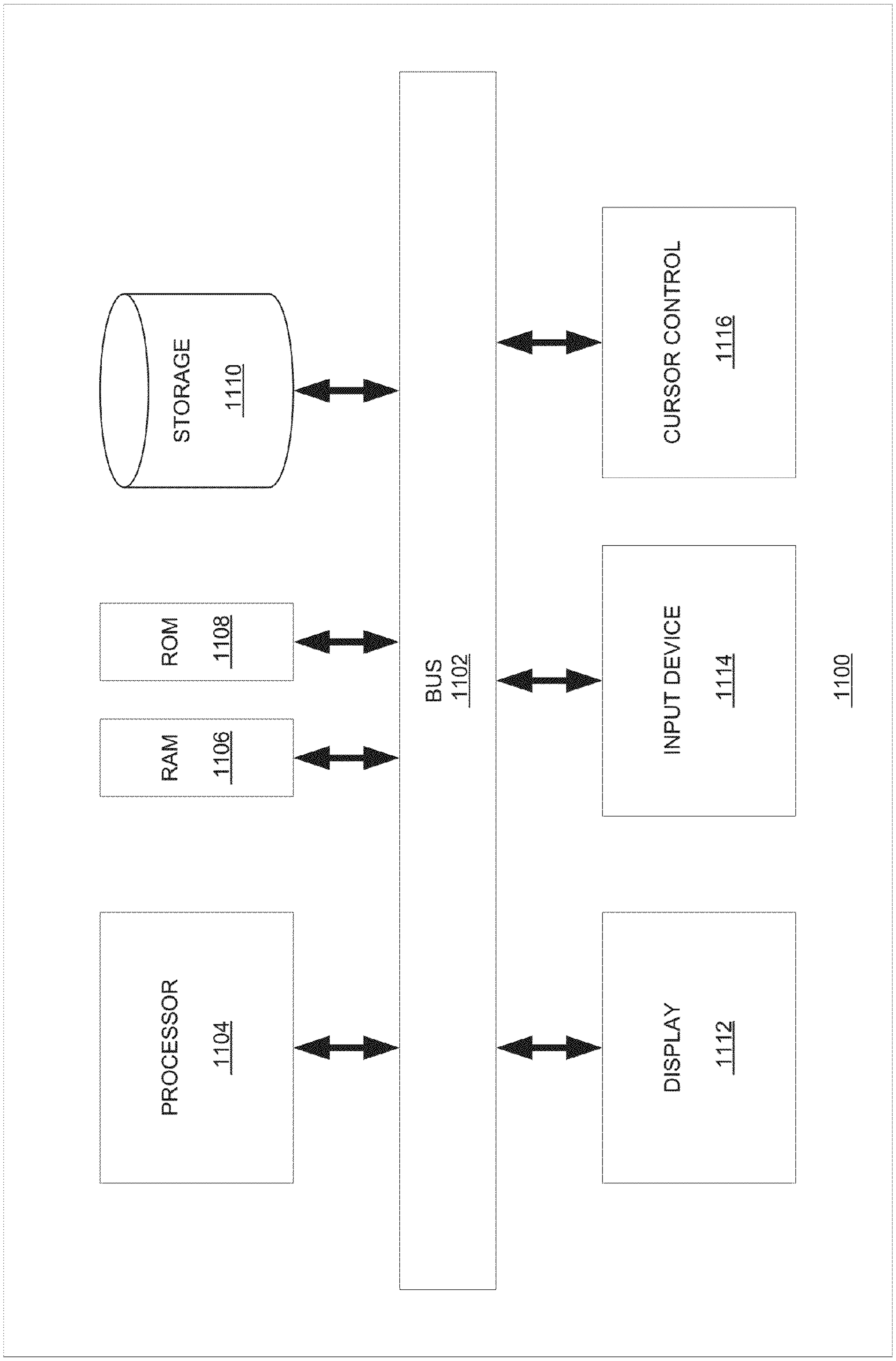
FIG. 11 is a block diagram illustrating an exemplary computer system, in accordance with various embodiments.

FIG. 11 is a block diagram that illustrates a computer system 1100, upon which embodiments of the present teachings may be implemented as which may form all or part of controller 1008 of mass spectrometry platform 1000 depicted in FIG. 10. In various embodiments, computer system 1100 can include a bus 1102 or other communication mechanism for communicating information, and a processor 1104 coupled with bus 1102 for processing information. In various embodiments, computer system 1100 can also include a memory 1106, which can be a random access memory (RAM) or other dynamic storage device, coupled to bus 1102 for determining base calls, and instructions to be executed by processor 1104. Memory 1106 also can be used for storing temporary variables or other intermediate information during execution of instructions to be executed by processor 1104. In various embodiments, computer system 1100 can further include a read only memory (ROM) 1108 or other static storage device coupled to bus 1102 for storing static information and instructions for processor 1104. A storage device 1110, such as a magnetic disk or optical disk, can be provided and coupled to bus 1102 for storing information and instructions.

In various embodiments, processor 1104 can include a plurality of logic gates. The logic gates can include AND gates, OR gates, NOT gates, NAND gates, NOR gates, EXOR gates, EXNOR gates, or any combination thereof. An AND gate can produce a high output only if all the inputs are high. An OR gate can produce a high output if one or more of the inputs are high. A NOT gate can produce an inverted version of the input as an output, such as outputting a high value when the input is low. A NAND (NOT-AND) gate can produce an inverted AND output, such that the output will be high if any of the inputs are low. A NOR (NOT-OR) gate can produce an inverted OR output, such that the NOR gate output is low if any of the inputs are high. An EXOR (Exclusive-OR) gate can produce a high output if either, but not both, inputs are high. An EXNOR (Exclusive-NOR) gate can produce an inverted EXOR output, such that the output is low if either, but not both, inputs are high.

TABLE 1

Logic Gates Truth Table

| INPUTS | | OUTPUTS | | | | | | |
|---|---|---|---|---|---|---|---|---|
| A | B | NOT A | AND | NAND | OR | NOR | EXOR | EXNOR |
| 0 | 0 | 1 | 0 | 1 | 0 | 1 | 0 | 1 |
| 0 | 1 | 1 | 0 | 1 | 1 | 0 | 1 | 0 |
| 1 | 0 | 0 | 0 | 1 | 1 | 0 | 1 | 0 |
| 1 | 1 | 0 | 1 | 0 | 1 | 0 | 0 | 1 |

One of skill in the art would appreciate that the logic gates can be used in various combinations to perform comparisons, arithmetic operations, and the like. Further, one of skill in the art would appreciate how to sequence the use of various combinations of logic gates to perform complex processes, such as the processes described herein.

In an example, a 1-bit binary comparison can be performed using a XNOR gate since the result is high only when the two inputs are the same. A comparison of two multi-bit values can be performed by using multiple XNOR gates to compare each pair of bits, and the combining the output of the XNOR gates using and AND gates, such that the result can be true only when each pair of bits have the same value. If any pair of bits does not have the same value, the result of the corresponding XNOR gate can be low, and the output of the AND gate receiving the low input can be low.

In another example, a 1-bit adder can be implemented using a combination of AND gates and XOR gates. Specifically, the 1-bit adder can receive three inputs, the two bits to be added (A and B) and a carry bit (Cin), and two outputs, the sum (S) and a carry out bit (Cout). The Cin bit can be set to 0 for addition of two one bit values, or can be used to couple multiple 1-bit adders together to add two multi-bit values by receiving the Cout from a lower order adder. In an exemplary embodiment, S can be implemented by applying the A and B inputs to a XOR gate, and then applying the result and Cin to another XOR gate. Cout can be implemented by applying the A and B inputs to an AND gate, the result of the A-B XOR from the SUM and the Cin to another AND, and applying the input of the AND gates to a XOR gate.

TABLE 2

| 1-bit Adder Truth Table | | | | |
|---|---|---|---|---|
| INPUTS | | | OUTPUTS | |
| A | B | Cin | S | Cout |
| 0 | 0 | 0 | 0 | 0 |
| 1 | 0 | 0 | 0 | 1 |
| 0 | 1 | 0 | 0 | 1 |
| 1 | 1 | 0 | 1 | 0 |
| 0 | 0 | 1 | 0 | 1 |
| 1 | 0 | 1 | 1 | 0 |
| 0 | 1 | 1 | 1 | 0 |
| 1 | 1 | 1 | 1 | 1 |

In various embodiments, computer system 1100 can be coupled via bus 1102 to a display 1112, such as a cathode ray tube (CRT) or liquid crystal display (LCD), for displaying information to a computer user. An input device 1114, including alphanumeric and other keys, can be coupled to bus 1102 for communicating information and command selections to processor 1104. Another type of user input device is a cursor control 1116, such as a mouse, a trackball or cursor direction keys for communicating direction information and command selections to processor 1104 and for controlling cursor movement on display 1112. This input device typically has two degrees of freedom in two axes, a first axis (i.e., x) and a second axis (i.e., y), that allows the device to specify positions in a plane.

A computer system 1100 can perform the present teachings. Consistent with certain implementations of the present teachings, results can be provided by computer system 1100 in response to processor 1104 executing one or more sequences of one or more instructions contained in memory 1106. Such instructions can be read into memory 1106 from another computer-readable medium, such as storage device 1110. Execution of the sequences of instructions contained in memory 1106 can cause processor 1104 to perform the processes described herein. In various embodiments, instructions in the memory can sequence the use of various combinations of logic gates available within the processor to perform the processes describe herein. Alternatively hard-wired circuitry can be used in place of or in combination with software instructions to implement the present teachings. In various embodiments, the hard-wired circuitry can include the necessary logic gates, operated in the necessary sequence to perform the processes described herein. Thus implementations of the present teachings are not limited to any specific combination of hardware circuitry and software.

The term "computer-readable medium" as used herein refers to any media that participates in providing instructions to processor 1104 for execution. Such a medium can take many forms, including but not limited to, non-volatile media, volatile media, and transmission media. Examples of non-volatile media can include, but are not limited to, optical or magnetic disks, such as storage device 1110. Examples of volatile media can include, but are not limited to, dynamic memory, such as memory 1106. Examples of transmission media can include, but are not limited to, coaxial cables, copper wire, and fiber optics, including the wires that comprise bus 1102.

Common forms of non-transitory computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, PROM, and EPROM, a FLASH-EPROM, any other memory chip or cartridge, or any other tangible medium from which a computer can read.

In accordance with various embodiments, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed.

In various embodiments, the methods of the present teachings may be implemented in a software program and applications written in conventional programming languages such as C, C++, G, etc.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

The embodiments described herein, can be practiced with other computer system configurations including hand-held devices, microprocessor systems, microprocessor-based or programmable consumer electronics, minicomputers, mainframe computers and the like. The embodiments can also be practiced in distributing computing environments where tasks are performed by remote processing devices that are linked through a network.

It should also be understood that the embodiments described herein can employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations that form part of the embodiments described herein are useful machine operations. The embodiments, described herein, also relate to a device or an apparatus for performing these operations. The systems and methods described herein can be specially constructed for the required purposes or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

Certain embodiments can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

What is claimed is:

1. An ion transport device of a mass spectrometer, comprising:

a plurality of pole rod pairs arranged in parallel, the pole rod pairs defining a plurality of ion transport cells, each ion transport cell uniquely corresponding, to a contiguous group of a fixed number of pole rod pairs, such that no two ion transport cells share a common pole rod pair;

a fragmentation cell for supplying ions to the ion transport device, wherein the ion transport device is positioned and oriented to receive ions from the fragmentation cell travelling in a direction parallel to the primary axes of the pole rods; and a controller configured to apply voltages in a repeating pairs pattern to the pole rod airs thereby creating a plurality of potential wells capable of capturing ions, wherein each ion transport cell receives the same pattern of voltages;

move the repeating voltage pattern along the pole rod pairs to move captured ions within and between the plurality of ion transport cells along the ion transport device; and apply at least one ejection voltage to one or more electrodes to cause ions to be ejected from the ion transport device in a direction parallel to the pole rods.

2. The ion transport device of claim 1, wherein the ions are transported along the ion transport device in a direction perpendicular to the primary axes of the pole rods.

3. The ion transport device of claim 1, wherein the controller is configured to apply at least one ejection voltage to one or more electrodes to generate a DC potential gradient that causes ions to be ejected from the ion transport device.

4. The ion transport device of claim 1, wherein each pole rod pair includes a pole rod having a RF+ polarity and a pole rod having an RF-pole rod polarity.

5. The ion transport device of claim 4, wherein adjacent pole rod pairs have opposite RF pole rod polarities.

6. The ion transport device of claim 1, wherein the spacing between pole rods of a pole rod pair is greater than the spacing between pole rod pairs.

7. The ion transport device of claim 1, wherein the spacing between pole rod pairs is substantially equal along the length of the ion transport device.

8. The ion transport device of claim 1, wherein the spacing between pole rods of a pole rod pair is between two and four times greater than the spacing between pole rod pairs.

9. The ion transport device of claim 1, wherein the repeating voltage pattern is a stepped voltage pattern.

10. The ion transport device of claim 9, wherein the stepped voltage pattern is a pattern of High-Low-High applied across three pole rod pairs.

11. The ion transport device of claim 9, wherein the stepped voltage pattern is a pattern of High-Low-Low-High applied across four pole rod pairs.

12. The ion transport device of claim 9, wherein the stepped voltage pattern is a pattern of High-Low-Low-Low-High applied across five pole rod pairs.

13. The ion transport device of claim 1, wherein the repeating voltage pattern is a pattern of continuously varying voltage levels.

14. The ion transport device of claim 13, wherein the pattern of continuously varying voltage levels is applied across three pole rod pairs and is defined by $V1(t)=+V*\cos(Pi/4-\omega*t)$, $V2(t)=-V*\cos(Pi/4-\omega*t)$, $V3(t)=+V*\cos(Pi/4-\omega*t)$.

15. The ion transport device of claim 13, wherein the pattern of continuously varying voltage levels is applied across four pole rod pairs and is defined by $V1(t)=V*\cos(\omega*t-Pi/4)$, $V2(t)=V*\sin(\omega*t-Pi/4)$, $V3(0=-V*\cos(\omega*t-Pi/4)$, $V4(t)=-V*\sin(\omega*t-Pi/4)$.

16. The ion transport device of claim 13, wherein the pattern of continuously varying voltage levels is applied across five pole rod pairs and is defined by $V1(t)=V*\cos(\omega t-Pi/5)$, $V2(0=-V*\cos(\omega*t+(2/5)*Pi)$, $V3(t)=-V*\cos(\omega*t)$, $V4(t)=-V*\cos(\omega t-(2/5)*Pi)$, $V5(t)=V*\cos(\omega*t+Pi/5)$.

17. A mass spectrometer, comprising:

an ion source;

a ion transport device including a plurality of pole rod pairs arranged in parallel, the pole rod pairs defining a plurality of ion transport cells, each ion transport cell uniquely corresponding to a contiguous group of a fixed number of pole rod pairs, such that no two ion transport cells share a common pole rod pair;

a fragmentation cell for supplying ions to the ion transport device, wherein the ion transport device is positioned and oriented to receive ions from the fragmentation cell traveling in a direction parallel to the primary axes of the pole rods;

one or more mass analyzers; and a controller configured to apply voltages in a repeating voltage pattern to the pole rod pairs thereby creating a plurality of potential wells capable of capturing ions, wherein each ion transport cell receives the same pattern of voltages; and move the repeating voltage pattern along the pole rod pairs to move captured ions within and between the plurality of ion transport cells along the ion transport device.

18. The mass spectrometer of claim 17, wherein the ions are transported along the ion transport device in a direction perpendicular to the pole rods.

19. The mass spectrometer of claim 17, wherein the controller is configured to apply at least one ejection voltage to one or more electrodes to cause ions to be ejected from the ion transport device in a direction parallel to the pole rods.

20. The mass spectrometer of claim 19, wherein the pole rods are divided into a plurality of segments and the controller is configured to apply a DC potential gradient across the segmented rods to eject the ions from the ion transport device.

21. The mass spectrometer of claim 17, wherein the spacing between pole rods of a pole rod pair is greater than the spacing between pole rod pairs.

22. The mass spectrometer of claim 17, wherein the spacing between pole rods of a pole rod pair is reduced near the ion ejection point of ion transport device.

23. The mass spectrometer of claim 22, wherein the RF voltage is reduced near the ion ejection point of ion transport device.

24. The mass spectrometer of claim 17, wherein the spacing between pole rod pairs is substantially equal along the length of the ion transport device.

25. A method of transporting ions along an ion transport device, the ion transport device including a plurality of ion transport cells arranged in parallel, the ion transport cells including a contiguous group of a fixed number of pole rod pairs arranged in parallel, such that no two ion transport cells share a common pole rod pair, the plurality of ion transport cells including first and second ion transport cells, the method comprising:

applying an initial voltage pattern to the pole rod pairs of the ion transport cells to create a plurality of potential wells within the ion transport cells, wherein each ion transport cell receives the same pattern of voltages;

injecting a first plurality of ions into the first ion transport cell traveling in a direction parallel to the primary axes of the pole rods and capturing the first plurality of ions in the potential well of the first ion transport cell;

altering the voltage pattern applied to the pole rods of the ion transport cells to move the potential well and the first plurality of ions to the second ion transport cell; and injecting a second plurality of ions into the first ion transport cell traveling in a direction parallel to the primary axes of the pole rods and capturing the second plurality of ions in the potential well of the first ion transport cell when a first cycle of the altering the voltage pattern is complete.

26. The method of claim 25, wherein the ions are transported along the ion transport device in a direction perpendicular to the pole rods.

27. The method of claim 25, wherein each pole rod pair includes a pole rod having a RF+ polarity and a pole rod having an RF− pole rod polarity.

28. The method of claim 25, wherein adjacent pole rod pairs have opposite RF pole rod polarities.

* * * * *